United States Patent [19]

Jayawant

[11] 3,927,189
[45] Dec. 16, 1975

[54] METHOD FOR MAKING PEROXYDISULFURIC ACID AND SALTS THEREOF
[75] Inventor: Madhusudan D. Jayawant, Hockessin, Del.
[73] Assignee: E. I. Du Pont de Nemours & Co., Wilmington, Del.
[22] Filed: Apr. 12, 1974
[21] Appl. No.: 460,610

[52] U.S. Cl. ............................................. 423/513
[51] Int. Cl.² ..................... C01B 15/06; C01B 15/08
[58] Field of Search .......................... 423/513, 521

[56] References Cited
FOREIGN PATENTS OR APPLICATIONS
967,951  8/1964  United Kingdom ................ 423/513

OTHER PUBLICATIONS
Price, "Per–Acids and Their Salts," Longmans, Green & Co., London, 1912, p. 22.

Primary Examiner—Earl C. Thomas

[57] ABSTRACT

A non-electrolytic process for making peroxydisulfuric acid by the reaction of sulfur trioxide with peroxymonosulfuric acid and/or hydrogen peroxide under defined conditions by which quite high yields of peroxydisulfuric acid are obtained. Ammonium, alkali metal and alkaline earth metal salts of peroxydisulfuric acid are produced by treating the acid with the corresponding hydroxide, oxide, sulfate or carbonate.

7 Claims, No Drawings

METHOD FOR MAKING PEROXYDISULFURIC ACID AND SALTS THEREOF

BACKGROUND OF THE INVENTION

1. Field of the Invention

The invention relates to the manufacture of peroxydisulfuric acid by the reaction of sulfur trioxide with peroxymonosulfuric acid and/or hydrogen peroxide and also to the manufacture of certain metal salts of peroxydisulfuric acid.

2. Description of the Prior Art

Peroxydisulfuric acid, sometimes known as Marshall's acid, is a white crystalline solid having a melting point of 65°C. It is, of course, a quite active and rather unstable oxidizing agent containing 8.2% by weight active oxygen. Because of its relative instability and moisture sensitivity, peroxydisulfuric acid is seldom isolated. Instead, it is synthesized and used in solutions chiefly as an intermediate to make hydrogen peroxide. Heretofore, peroxydisulfuric acid has been made almost entirely by electrolysis of sulfuric acid, as follows:

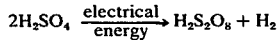

Furthermore, as mentioned above, essentially the only use of the acid has been as an intermediate in the manufacture of hydrogen peroxide, viz.:

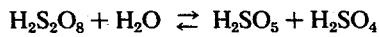

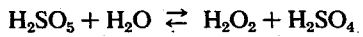

However, the corresponding salts of peroxydisulfuric acid are used extensively in industry as polymerization catalysts, laboratory oxidizing reagents, for soap and fat bleaching, oxidation of dyestuffs, treatment of metal surfaces and as maturing agents for wheat flour. Of the many salts of peroxydisulfuric acid, ammonium, sodium and potassium are by far the most widely used. Of particular importance is the use of potassium peroxydisulfate as a free radical initiator for the polymerization of wide variety of monomers, but especially as a component of redox catalyst systems and as promotor for the polymerization of styrene-butadiene monomer systems. In this latter use, the salt is customarily referred to rather ambiguously as "potassium persulfate."

Nevertheless, these important derivatives of peroxydisulfuric acid have not heretofore been made from the peroxydisulfuric acid, but from ancillary materials. For example, ammonium peroxydisulfate is made by anodic electrolysis of ammonium bisulfate and potassium peroxydisulfate is made by the addition of potassium bisulfate or potassium hydroxide to the ammonium peroxydisulfate electrolysis liquors described above. Thus, as a practical matter, the manufacture of peroxydisulfuric acid and its salts has been limited to electrolytic processes.

To a substantial degree, the previous lack of industrial interest in peroxydisulfuric acid (also often referred to as perdisulfuric acid) is reflected in the published literature. For example, in Jones, W. N., *Inorganic Chemistry*, Blakiston Co., 1947, pp. 418–19. The reaction of hydrogen peroxide and sulfur trioxide to form peroxydisulfuric acid is disclosed broadly without reference to reaction conditions or yields. In U.S. Pat. No. 2,926,998 to D'Addieco et al., it is disclosed that up to about 5% by weight peroxydisulfuric acid is obtained as an unwanted byproduct in the manufacture of peroxymonosulfuric acid by reaction of concentrated hydrogen peroxide and oleum. Leaver et al. in U.S. Pat. No. 3,351,426 disclose that a mixture of hydrogen peroxide, bisulfates and peroxymonosulfates is converted to peroxydisulfates upon heating to 75°–300°C. under vacuum. Similarly to the D'Addieco et al. patent cited above, U.K. Pat. No. 967,951 to Marshall discloses that 0–30.5 mole % peroxydisulfuric acid may result from the reaction of concentrated hydrogen peroxide and gaseous sulfur trioxide at 20°–50°C.

The invention therefore provides a process by which peroxydisulfuric acid (PODISA) can be made nonelectrolytically in economically quite high yields and in such form that the acid itself may be used directly for the preparation of the many useful salts thereof.

More particularly, the invention provides a process for making peroxydisulfuric acid comprising the steps of a. forming a dispersion of sulfur trioxide and active oxygen precursors in which the ratio by weight of sulfur trioxide to the sum of the weight of the active oxygen precursors and any water present corresponds to from about X − 0.015A − 0.0046B to about 1.5X, wherein X is defined by the relationship (0.00264A − 0.03741B + 4.4434), wherein A is the % by weight hydrogen peroxide and B is the % by weight peroxymonosulfuric acid, the basis of the above relationships being predicated upon the sum of the weight of the active oxygen precursors and any water which is present; and b. maintaining the dispersion in the liquid phase at a temperature no higher than about 45°C. until the active oxygen distribution of the final reactant mixture therefrom is less than about 67 mole % active oxygen precursors and more than about 33 mole % peroxydisulfuric acid.

DEFINITIONS

The term "active oxygen" (A.O.) as used herein means the available oxygen, expressed in terms of atomic oxygen having a gram equivalent weight of 8.00, contained in peroxidic compounds such as peroxides, perborates, percarbonates, persulfates and the like. The A.O. value is a measure of the oxidizing power of such compounds. Thus, pure $H_2O_2$ has an A.O. content of 47.0% by weight.

The terms "active oxygen distribution" as used herein means the distribution on a molar basis of the components of the reaction mixture containing active oxygen in a given system. Within the context of the invention active oxygen distribution (A.O. Distribution) would be limited to the molar proportions of the hydrogen peroxide, peroxymonosulfuric acid and peroxydisulfuric acid contained in the system in question.

The term "active oxygen precursors" as used herein refers to peroxymonosulfuric acid or hydrogen peroxide or to mixtures of the two.

The term "dispersion" as used herein refers to liquid dispersions including both homogeneous dispersions such as solutions and non-homogeneous dispersions such as solid/liquid, liquid/liquid and gas/liquid mixtures and combinations of such type of dispersions.

DETAILED DESCRIPTION OF THE INVENTION

The process of the invention proceeds according to the following described basic reaction:

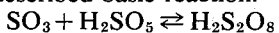
$$SO_3 + H_2SO_5 \rightleftarrows H_2S_2O_8$$

Notwithstanding the fact that the basic reaction proceeds from the peroxymonosulfuric acid (POMOSA), because of the rather low stability of this material, it will, as a practical matter, be preferred to carry out the reaction concurrently with the preparation of fresh POMOSA from hydrogen peroxide and sulfur trioxide, as follows:

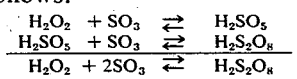

$$\begin{array}{rcl} H_2O_2 + SO_3 & \rightleftarrows & H_2SO_5 \\ H_2SO_5 + SO_3 & \rightleftarrows & H_2S_2O_8 \\ \hline H_2O_2 + 2SO_3 & \rightleftarrows & H_2S_2O_8 \end{array}$$

In carrying out the above-noted reactions, either 100% hydrogen peroxide or aqueous solutions thereof may be used. As a matter of general practice, aqueous peroxide solutions containing 10–90 percent by weight and preferably 35–90 percent by weight hydrogen peroxide will be used since they are more economical and are readily available in commercial quantities. It is preferred that the hydrogen peroxide be stabilized to reduce decomposition in handling and storage with hydrogen peroxide stabilizers such as ethylenediamine tetraacetic acid, diethylenetriamine pentaacetic acid, sodium stannate, ammonium nitrate, organic phosphonates and magnesium compounds.

Though hydrogen peroxide and/or peroxymonosulfuric acid are the preferred starting materials for carrying out the method of the invention, it will be apparent to those skilled in the art that other peroxidic compounds capable of forming either hydrogen peroxide or peroxymonosulfuric acid may be used as well. Examples of such compounds are potassium monopersulfate dissolved in water and treated with free $H_2SO_4$ and sodium perborate which upon treatment with $H_2SO_4$ forms free $H_2O_2$.

The sulfur trioxide reactant can be provided for the reaction in either gaseous or liquid form or in association with sulfuric acid as commercially available oleums. Though in gaseous form pure sulfur trioxide can be used, it will ordinarily be preferred to use suitable mixtures with gases which are inert to the active oxygen reactant. By this means, polymerization of the $SO_3$ is reduced. Suitable inert gases for this purpose include nitrogen, oxygen, air, or their mixtures. It is likewise preferred that the sulfur trioxide be stabilized to reduce freezing and polymer formation. Thus, most of the sulfur trioxide useful for the process will be stabilized by means of such materials as phosphoric acid, tin compounds, boron oxide, phosgene, $SiCl_4$, $Na_2SiF_6$, dimethyl phthalate, methylated chlorosilanes, dimethylsulfate, $SnCl_4$, etc.

The relative initial amounts of peroxymonosulfuric acid, sulfur trioxide and hydrogen peroxide are governed by the above-referred basic reactions. Thus, it is preferred that the mol ratio of $SO_3$ to $H_2O_2$ be at least 2 and the mol ratio of $SO_3$ to $H_2SO_5$ be at least 1 in order to obtain optimum yields of product. It has also been found that the $SO_3:H_2O_2$ and $SO_3:H_2SO_5$ ratios should not be too high lest substantial product instability arise.

In this latter regard, it has been found that the optimum ratio of $SO_3$ to the active oxygen precursors depends substantially upon the extent to which water is present in the system. In most instances, this is an inverse function of the concentration of active oxygen precursors in the aqueous solution used. Thus, if the amount of water in the reaction system is high, as when quite dilute active oxygen precursor solutions are used, the $SO_3$:active oxygen precursor ratio must be considerably higher than when more concentrated active oxygen precursor solutions are used. In particular it has been found that peroxydisulfuric acid is produced with economical yield and stability if the weight ratio of added $SO_3$ to the sum of weights of active oxygen precursors and water, if any, corresponds to from about $X - 0.015A - 0.0046B$ to about $1.5X$, wherein X is defined by the relationship $(0.00264A - 0.03741B + 4.4434)$, wherein A is the weight percent of hydrogen peroxide and B is the weight percent of peroxymonosulfuric acid in the dispersion of hydrogen peroxide, peroxymonosulfuric acid and water, if any.

Because the reactions used here take place in the liquid phase or at a gas-liquid interface, it is apparent that the pressure of reaction is not a significant operating variable except as it may affect the fugacity of the $SO_3$ gas and thus the efficiency of the process as regards $SO_3$ utilization. Therefore, to reduce $SO_3$ losses, it is preferred to operate the process of the invention at a pressure of one atmosphere or higher.

Though the temperature of the process is not critical in the sense of mere operability, it is nevertheless important that the process be run at a temperature no higher than about 45°C, and preferably 35°C, to maintain good PODISA yields. With temperature substantially above these, products yields are reduced substantially. The lower operating temperature limit is that at which any of the reactants or intermediate reaction products are solidified and/or precipitated from the reaction mixture. In general, this minimum operating temperature at which all the reactants are in the liquid (or gaseous) phase will lie above the freezing point of any of the reactants, particularly the water. Since no especial advantages attend the use of lower temperatures (e.g., 0°C), it will ordinarily be preferred to use temperatures which are nearly ambient (ca. 20°C).

It will be noted that any water present in the active oxygen precursors does not partake in the formation of $H_2S_2O_8$. It does not however, absorb $SO_3$ to form $H_2SO_4$ for which reason the amount of $SO_3$ in the reaction mixture is adjusted upward in response to higher dilutions of active oxygen precursors in the system.

In carrying out the process of the invention, the reaction may be carried out batchwise, intermittantly or continuously as may be desired. However, it is important that the $SO_3$ be added to the active oxygen precursors or that they be mixed simultaneously to avoid adverse equilibrium conditions. Thus, gaseous $SO_3$ will be bubbled through the active oxygen precursors, or liquid $SO_3$ or oleum will be added to the active oxygen precursor with stirring to minimize localized areas in which there are high concentrations of $SO_3$ vis-a-vis active oxygen precursors.

When the process is run on an intermittant basis, it is possible to encounter an active oxygen precursor dispersion containing $H_2O_2$, $H_2S_2O_8$, $H_2SO_5$, $H_2SO_4$ and some free $SO_3$. Water may be absent in such a system. In this case, the amount of additional $SO_3$ to be mixed with the above dispersion to convert the $H_2SO_5$ and $H_2O_2$ into $H_2S_2O_8$ will be equal to the amount calculated from the suitable "X" value of the general formula, less the total amount of free $SO_3$ initially present in the active oxygen dispersion.

The central product of the process of the invention, POSISA, is present in the reaction mixture in dispersion with POMOSA and any unreacted $H_2O_2$ and reactant carriers such as water and sulfuric acid. PODISA, which is a white crystalline solid, can be readily separated from the reaction mixture by lowering the temperature of the reaction mixture to below about 20°C at which temperature PODISA is precipitated from solution. However, because of relative instability of this product, it will usually be either left in the reaction mixture or redissolved in water for subsequent use.

It has been found that several quite important salts of PODISA can be made directly from the reaction mixture. In particular, ammonium, alkali metal and alkaline earth metal salts may be prepared by adding the corresponding carbonate, hydroxide, oxide or sulfate thereeof to PODISA in solution. Of the alkaline earth metal salts, the calcium and magnesium salts are of principal interest at this time. The ammonium, sodium and potassium salts are, as mentioned previously, of substantial commerical importance.

The PODISA salts are readily prepared by addition of the above-described metallic compounds to either the reaction mixture or to solutions of the essentially pure acid. In the former case, because both POMOSA and the salts thereof are quite soluble in water and because the corresponding PODISA salts are relatively less soluble, the PODISA salts are readily precipitated in crystalline form and may be easily separated from the reaction mixture by such methods as filtration, centrifugation, decantation and the like.

The invention can be more thoroughly understood by reference to the following examples:

EXAMPLE 1

Gaseous $SO_3$ carried by dry $N_2$ gas was slowly bubbled in 100 g of peroxymonosulfuric ($H_2SO_5$) acid solution containing 71.3% $H_2SO_5$, 16.2% $H_2SO_4$, 3.4% $H_2O_2$ and 9.9% $H_2O$. The reaction temperature was maintained at 20°–25°C. After about 4½ hours of $SO_3$ treatment, the reaction was stopped and the reaction mixture analyzed. The analysis was: 18.3% $H_2S_2O_8$, 12.4% $H_2SO_5$, 0.3% $H_2O_2$, 62.02% $H_2SO_4$, 6.98% $H_2O$. The active oxygen (A.O.) distribution was: 44.5 mol % $H_2S_2O_8$, 51.3 mol % $H_2SO_5$, and 4.2 mol % $H_2O_2$. The weight increase in the batch due to $SO_3$ was 70.4 grams.

In the foregoing example, from values of A = 4.0 and B = 84.3, X was determined to be 1.3. Thus, the weight ratio of sulfur trioxide to the total weight of active oxygen precursors and water was 0.54X.

EXAMPLE 2

One hundred twenty grams of the reaction product of Example 1 containing 18.3% $H_2S_2O_8$ was added slowly to 250 ml of ice cold distilled water. The temperature was maintained at 0°–5°C. To this was added dropwise, with stirring, at 0°–5°C 50.7 wt % KOH solution. Solid precipitate began to appear when 33.4 g of KOH solution was added. KOH addition was stopped, the reaction mixture stirred for ½ hour and solid filtered off. The solid was then washed with two ice cold (50 ml) water washes and one (50 ml) absolute ethanol wash. The product was dried in a forced air oven at room temperature overnight.

The dry product weighed 24.1 g and showed an active oxygen content of 6.0 percent. X-ray crystallographic analysis confirmed it to be $K_2S_2O_8$. The first crop yield of this product based on starting $H_2S_2O_8$ was 78 percent of the theoretical.

EXAMPLE 3

Gaseous $SO_3$ carried by dry $N_2$ gas was bubbled into 95.7 g of peroxymonosulfuric acid containing 66.2% $H_2SO_5$, 3.9% $H_2O_2$, 8.8% $H_2O$ and 21.1% $H_2SO_4$. The reaction temperature was maintained at 15°–20°C. The total amount of $SO_3$ required according to the general formula was 100 g (1.24 moles). When about 100 g of $SO_3$ were added to the reaction mixture, there was formation of solid in the reaction mixture and there was temperature rise of about 7°C due to heat of crystallization of $H_2S_2O_8$. The reaction was stopped. The weight of the batch was 196 g and the active oxygen analysis of the reaction mixture was 37.2% $H_2S_2O_8$, 7.4% $H_2SO_5$, 0.2% $H_2O_2$. This amounted to 73.0 mol % $H_2S_2O_8$, 24.7 mol % $H_2SO_5$ and 2.2 mol % $H_2O_2$.

The yield of $H_2S_2O_8$ from $H_2SO_5$ + $H_2O_2$ was 87.9 percent of theory.

In the foregoing example, from values of A = 4.94 and B = 83.9, X was determined to be 1.32. Thus, the weight ratio of sulfur trioxide to the total weight of active oxygen precursors and water was 1.0X.

EXAMPLE 4

This example describes the formation of $H_2S_2O_8$ from $H_2O_2$.

Stabilized, liquid $SO_3$ was added to 48.2 g of 70.6% Albone hydrogen peroxide (one mol); 116 ml (216 g, 2.70 mols) of $SO_3$ were added in about six hours. ($SO_3$ required according to calculations — 2.79 mols.) The reaction temperature was 15°± 3°C.

The final product weighed 264 g and showed 61.4% $H_2S_2O_8$, 4.75% $H_2SO_5$ and 0.25% $H_2O_2$; the active oxygen distribution was 84.6 mol % $H_2S_2O_8$ 11.1 mol % $H_2SO_5$ and 4.3 mol % $H_2O_2$. The yield of $H_2S_2O_8$ from $H_2O_2$ was 94% of theory.

In the foregoing example, from values of A=70.6 and B=0, X was determined to be 4.63. Thus, the weight ratio of sulfur trioxide to the total weight of active oxygen precursors and water was 0.97X.

EXAMPLE 5

This reaction exemplifies the effects of excess $SO_3$ on $H_2S_2O_8$ stability.

To 48.2 g of 70.6% $H_2O_2$ (one mol) was added dropwise freshly distilled liquid $SO_3$. The amount of $SO_3$ calculated to give optimum yield of stable $H_2S_2O_8$ was 2.786 mols (223 g). Instead, 290 g of $SO_3$ was added over a period of about three hours. When $SO_3$ added was about 193 g, there was separation of solid in the reaction mixture. When $SO_3$ was continued, there appeared distinct change in the reaction mixture. At about 270 g $SO_3$, there was continuous bubbling in the reaction mixture without any (exothermic) temperature change. After adding 290 g of $SO_3$, the reaction mixture was set aside for about 17 hours at room temperature and analyzed. It contained no active oxygen due to $H_2O_2$, $H_2SO_5$ or $H_2S_2O_8$, showing total decomposition.

As against this, the $H_2S_2O_8$ preparation of Example 4, when analyzed after keeping for about 17 hours at room temperature, showed 62.4% $H_2S_2O_8$. There was thus no loss of $H_2S_2O_8$ content of the reaction.

In the foregoing example, from values of A = 70.6 and B = 0, X was determined to be 4.63. Thus, the weight ratios of sulfur trioxide to the total weight of active oxygen precursors and water was 1.3X.

EXAMPLES 6, 7, 8

Peroxydisulfuric acid was prepared by adding liquid, stabilized $SO_3$ to hydrogen peroxide. It will be noted that in these examples of the weight ratio of $SO_3$ to the total weight of active oxygen precursors and water was about 1.0X. A ratio of from about 0.7X to about 1.1X is preferred for economic reasons. The following are details of reaction conditions and results.

TABLE 1

| Ex. | Reaction Temp. ± 4°C | H$_2$O$_2$ mol | H$_2$O$_2$ Concen. % by Wt | SO$_3$ g Used | SO$_3$ mols | SO$_3$ g | Yield Based on Reacted H$_2$O$_2$ |
|---|---|---|---|---|---|---|---|
| 6 | 35 | 1 | 70.6 | 48.2 | 2.79 | 223 | 68.9 |
| 7 | 25 | 1 | 70.6 | 48.2 | 2.83 | 226 | 84.1 |
| 8 | 15 | .25 | 20 | 42.4 | 2.48 | 199 | 90.1 |

| Ex. | Final Product A.O. DISTRIBUTION (mol %) H$_2$S$_2$O$_8$ | H$_2$SO$_5$ | H$_2$O$_2$ | A | B | X | Weight Ratio of SO$_3$ to Total Weight of Active Oxygen Precursors & H$_2$O |
|---|---|---|---|---|---|---|---|
| 6 | 68.4 | 30.3 | 1.3 | 70.6 | 0 | 4.63 | 1.00X |
| 7 | 86.2 | 13.8 | 0 | 70.6 | 0 | 4.63 | 1.01X |
| 8 | 76.1 | 23.9 | 0 | 20.0 | 0 | 4.5 | 1.04X |

ANALYTICAL PROCEDURE

In the foregoing examples, the procedure used for analysis of reaction mixtures was as follows:

Analysis of $H_2SO_4$, $H_2O_2$, $H_2SO_5$ and the total of $H_2O_2$, $H_2SO_5$ and $H_2S_2O_8$ was performed by a series of four titrations in the precise sequence shown.

Titration $A_a$ (Analysis of $H_2SO_4$)

1. Accurately add about 0.2–0.3 g (5–8 drops) of sample (weighed by difference) to a 500 ml beaker containing about 150 ml of slurry of washed cracked ice. Stir the mixture.
2. Add 3 drops of methyl red indicator and titrate with 0.1 N NaOH to yellow or colorless end point.
3. Record 0.1 N NaOH titer as A.

Titration $A_b$ (Analysis of $H_2O_2$)

1. Immediately take the above titrated solution and add 10 ml of 20% w/w $H_2SO_4$. It will turn pink.
2. Add one drop of ferroin indicator and titrate with 0.1 N Ce(SO$_4$)$_2$ until color changes from orange to either colorless or faint blue. (Do not add excess ceric solution as it may interfere with the titration $A_c$).
3. Record ceric titer as B.

Titration $A_c$ (Analysis of $H_2SO_5$)

1. Add immediately to the above titrated solution 10 ml of 25% KI and titrate with 0.1 N Na$_2$S$_2$O$_3$ until the color starts to fade. Then add 1 ml 1% starch solution and continue titration until the blue-black disappears. The final color will be yellow-orange.
2. Record thiosulfate titer as C.

Titration D (Analysis of total $H_2O_2$, $H_2SO_5$ and $H_2S_2O_8$)

1. Start with a fresh sample.
2. Add an accurately weighed amount of about 0.2–0.3 g (5–8 drops) of sample to 150 ml slurry of washed cracked ice in a 500 ml Erlenmeyer flask with stopper. Stir the mixture.
3. Add 10 ml 20% $H_2SO_4$.
4. Add 10 ml of 50% KI solution.
5. Add about 4 g (NH$_4$)$_2$SO$_4$ and stir to dissolve.
6. Add 1 ml of 2% ammonium molybdate solution.
7. Stopper the flask and heat on water bath (caution!) to 50°C and keep for 10 minutes.
8. Cool the flask to room temperature and titrate the liberated iodine against 0.1 N sodium thiosulfate.
9. Record thiosulfate titer as D.

Calculations $W_A$ = Sample wt for titration $A_a$ (g)
$W_D$ = Sample wt for titration $D$ (g)
$A$ ml = 0.1 N NaOH titer (for H$_2$SO$_4$)
$B$ ml = 0.1 N ceric sulfate titer (for H$_2$O$_2$)
$C$ ml = 0.1 N Na$_2$S$_2$O$_3$ titer (for H$_2$SO$_5$)
$D$ ml = 0.1 N Na$_2$S$_2$O$_3$ titer (for total peroxygen)

$$D \text{ ml} = \text{converted } D = \frac{D \times W_A}{W_D}$$

$$\% H_2SO_4 = \frac{[A + B + \frac{C}{2} - D] \times 0.49}{W_A}$$

$$\% H_2O_2 = \frac{B \times 0.17}{W_A}$$

$$\% H_2O_2 = \frac{C \times 0.57}{W_A}$$

$$\% H_2S_2O_8 = \frac{[D - (B + C)] \times 0.97}{W_A}$$

$$\% H_2O = 100 - (\% H_2SO_4 + \% H_2O_2 + \% H_2SO_5 + \% H_2S_2O_8)$$

If there is excess free $SO_3$ in the system, negative numbers are obtained for % water. In this case the water content is zero and the $SO_3$ content is $$\% SO_3 = \frac{80 \times (\% H_2SO_4 + \% H_2O_2 + \% H_2SO_5 + \% H_2S_2O_8 - 100)}{98}$$

The above calculations are based on 0.1N titrants in all titrations.

I claim:

1. A method for making peroxydisulfuric acid comprising the steps
   a. forming a dispersion of sulfur trioxide and active oxygen precursors selected from the group consisting of hydrogen peroxide, peroxymonosulfuric acid and mixtures thereof in which the ratio by weight of the sulfur trioxide to the sum of the weight of the active oxygen precursors and any water present corresponds to from about $X - 0.015A - 0.0046B$ to about 1.5X, wherein X is defined by the relationship ($0.00264A - 0.03741B + 4.4434$), wherein A is the % by weight hydrogen peroxide B is the % by weight peroxymonosulfuric acid, the basis of the above relationships being predicated upon the sum of the weight of the active oxygen precursors and any water which is present; and (b) maintaining the dispersion in the liquid phase at a temperature no higher than about 45°C until the active oxygen distribution of the final reactant mixture therefrom is less than about 67 mole % active oxygen precursors and more than about 33 mole % peroxydisulfuric acid.

2. The method of claim 1 in which the ratio by weight of sulfur trioxide to the sum of the weights of the active oxygen precursors and any water present corresponds to from about 0.7X to about 1.1X.

3. The method of claim 1 in which a salt of peroxydisulfuric acid is prepared from the reaction mixture by addition thereto of a compound selected from the group consisting of the carbonates, hydroxides, oxides and sulfates of a cation selected from the group consisting of ammonium, alkali metals and alkaline earth metals.

4. The method of claim 3 in which the compound added to the reaction mixtures is an hydroxide.

5. The method of claim 3 in which the compound added to the reaction mixture is a carbonate.

6. The method of claim 3 in which a salt of peroxydisulfuric acid is recovered from the reaction mixture by precipitation of the salt from the reaction mixture.

7. The method of claim 1 in which the peroxydisulfuric acid is recovered from the reaction mixture by lowering the temperature of the reaction mixture to below about 20°C, thus precipitating the acid from the reaction mixture, and separating the precipitated acid from the reaction mixture.

* * * * *